United States Patent [19]
Harper et al.

[11] 3,905,685
[45] Sept. 16, 1975

[54] ZOOM LENS FOR FIXED CONJUGATES

[75] Inventors: David C. Harper, Claremont; George L. McCrobie, Upland, both of Calif.; Edgar E. Price; Joachim A. Ritter, both of Webster, N.Y.

[73] Assignee: Xerox Corporation, Stamford, Conn.

[22] Filed: Feb. 13, 1974

[21] Appl. No.: 442,558

Related U.S. Application Data

[63] Continuation of Ser. No. 297,096, Oct. 12, 1972, abandoned.

[52] U.S. Cl. ............. 350/184; 350/215; 350/216
[51] Int. Cl.² ........................................ G02B 15/14
[58] Field of Search ......................... 350/184, 186

[56] References Cited
UNITED STATES PATENTS

| | | | |
|---|---|---|---|
| 3,116,359 | 12/1963 | Solisch | 350/184 |
| 3,687,522 | 8/1972 | Lynch et al. | 350/184 |
| 3,728,010 | 4/1973 | Mikami | 350/184 |

*Primary Examiner*—John K. Corbin
*Attorney, Agent, or Firm*—Robert J. Bird

[57] ABSTRACT

Heliar, Dagor and Gauss lens systems, by way of example, are converted to zoom lens systems by severing outer lens elements and displacing the severed elements equal distances but in opposite directions relative to the main body of the system. The curvatures of severed elements are critical and are discovered by empirical procedures.

5 Claims, 6 Drawing Figures

ZOOM LENS FOR FIXED CONJUGATES

This is a continuation of application Ser. No. 297,096, filed Oct. 12, 1972, now abandoned.

BACKGROUND OF THE INVENTION

This invention relates to "zoom" lenses or, more precisely, varifocal lenses. Specifically, this invention relates to novel zoom lens systems for operation under fixed overall conjugate requirements such as encountered in photocopying.

The zoom lens is an outgrowth or natural extension of the telephoto lens known since before the turn of this century. Broadly, the telephoto lens includes positive and negative lens elements moved relative to one another to vary the size of the image, i.e., to vary focal length, and moved together relative to the object to maintain the image focused onto the same image plane. The zoom lens was born when a mechanism was devised to simultaneously move lens elements relative to each other and relative to the object to vary image size while keeping the image in focus. Zoom lenses of the foregoing type are characterized as "mechanically compensated" zoom lenses. "Optically compensated" zoom lenses are those in which the rear focal length of the lens system remains fixed when certain lens elements within the system are moved to vary the effective focal length. One advantage of optically compensated zoom lenses is the simplification of the mechanism but this advantage is offset by an increase in the optical complexity.

Zoom lens systems are employed primarily in motion picture photography, still photography and television and normally involve infinite or at least non-fixed overall conjugates. The vast quantities of zoom lens systems generated for these industries are not readily adaptable to applications requiring fixed overall conjugates such as with photocopying machines. One reason for this non-adaptability is size limitation. To adapt a motion picture or television zoom lens to a machine that encloses the overall conjugate is difficult because either the lens system or the machine would have an impractical size. Another reason for the non-adaptability is economy of lens design. The motion picture and television cameras demand short focal length lens systems in order to handle both close up and distant scenes. The production tolerances on short focal length systems are not economical and are not necessary for copying machine applications where longer focal length lenses are used because of the comparatively large object and image distances.

Accordingly, it is an object of this invention to devise zoom lens systems for fixed conjugate applications.

Specifically, it is an object of the present invention to devise zoom lens systems for operation in machines wherein the overall conjugate is within the range of from about 10 to 100 inches.

Another object of the instant invention is to devise a zoom lens system compatible with photocopying machine applications.

Yet another object of the invention is to devise novel lens systems of the mechanically compensated type wherein the mechanical displacement of the lens elements and associated mechanism is greatly simplified.

These and other objects of this invention are realized by the discovery that a critical relationship exists between lens element displacement and curvature. A conventional lens system is converted to a zoom lens system by severing lens elements near each end of the system and assigning specific radii to the severed elements. The severed elements are moved at the same rate, or in equal increments, but in opposite directions relative to the main body of the lens system, while the entire system is moved relative to the object. All the motions are linear.

The present lens system falls within the "mechanically compensated" family of zoom lens systems. One significant difference between the present and prior zoom lenses, however, is the relative simplicity of the mechanical motions in the present system. Prior mechanically compensated zoom lens systems characteristically include highly intricate motions, few of which are linear.

DESCRIPTION OF THE DRAWINGS

The above and other objects of the present invention will be more apparent from the following description given in connection with the accompanying drawing, in which.

DESCRIPTION OF THE EMBODIMENTS

Figure 1:
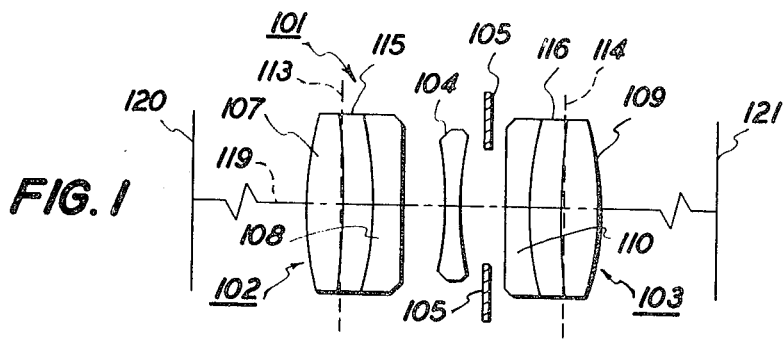
FIG. 1 is a schematic of a conventional Heliar lens system illustrating those lens elements that may be severed in order to obtain a zoom lens according to the present design.

The instant discovery may be illustrated in connection with a symmetrical Heliar lens system. The Heliar shown in FIG. 1 is designed for operation at 1X magnification with a focal length of 13.5 inches and aperture of $f/5.6$. A desirable magnification range is the continuous range extending from 1.08X to about 0.495X. This magnification range finds many applications in photocopying machines such as electrographic photocopying machines designed to reduce the size of engineering drawings and the like.

The Heliar lens system 101 includes identical doublets 102 and 103, symmetrically aligned on opposite sides of a symmetrical bi-concave singlet 104, with an aperture stop 105 positioned at an off-center location to the right of the singlet 104, all of which is disposed on an optical axis 119. The singlet 104 is symmetrical because one of its curvatures is the negative of the other. Doublet 102 includes a positive lens element 107 and a negative lens element 108 and doublet 103 includes a positive lens element 109 and a negative lens element 110.

To obtain the zoom lens capability, the Heliar 101 is modified by severing the positive lens elements 107 and and 109 along a line of critical curvature as indicated by the dashed lines 113 and 114. The severed lenses are moved relative to each other along the optical axis 119 to change the focal length of the system and all the lenses are moved along the optical axis relative to the object and image planes 120 and 121 to keep the image focused on plane 121.

"Severed" as used herein is intended to indicate an effect rather than a literal cutting process, although, a lens may be literally cut or ground along lines 113 and 114. The approach is to design certain lens elements "as if" they were the divided portions of a single parent lens element. This means that the mating surfaces of the severed lens elements have substantially the same curvatures and the sum of their thicknesses is substantially the thickness of the parent element. Machining tolerance will cause the thicknesses to add up to more or less than the sum of the parent thickness and the mating surfaces to have some differences in their mating curvatures. In addition, one or both of the severed lenses may be "bent" to compensate for aberrations as is understood by optical designers and thereby cause the curvatures of the mating surfaces to differ.

In FIGS. 2, 3, 5 and 6 the severed lens elements have larger diameters than a lens element formed by literally cutting a parent element but otherwise have complimentary thicknesses and curvatures. The increased diameter is to provide sufficient clear aperture in the outer elements and to facilitate mounting. The initial air space has some finite value to prevent physical contact between the movable and their adjacent lens elements when the lens is in the closed position.

The critical relationship between the curvatures 113 and 114 of the severed lens elements and displacement has so far been empirically determined. The performance of a system over some magnification range is compared for different values of radius ranging from ± 0.7F (Where F is the focal length) to infinity. For each lens system tested, e.g., Heliar, Dagor, and Gauss, the system performance is substantially superior for a very definite range of radius values. For example, the Heliar zoom lens system of FIGS. 2 and 3 yields exceptional performance over a wide magnification range for radii of around +25 to +60 inches for surface 113 and −25 to −60 inches for surface 114. The effect is not normally bi-polar in that the Heliar system of FIGS. 2 and 3 does not yield the same results for curvatures of opposite polarity i.e., for surface 113 to be −25 to −60 inches and surface 114 +25 to +60 inches.

The performance alluded to is judged objectively by observation, calculation, and measurement of selected aberrations such as: spherical abberration; coma; lateral color; and other known lens system characteristics used to evaluate a lens system.

The magnification provided by the present zoom lens is obtained by steps including varying the spacings between the severed and parent elements (e.g. spacings 123 and 124 in FIGS. 2 and 3) and moving all the elements relative to the object and image planes 120 and 121.

Figure 2:
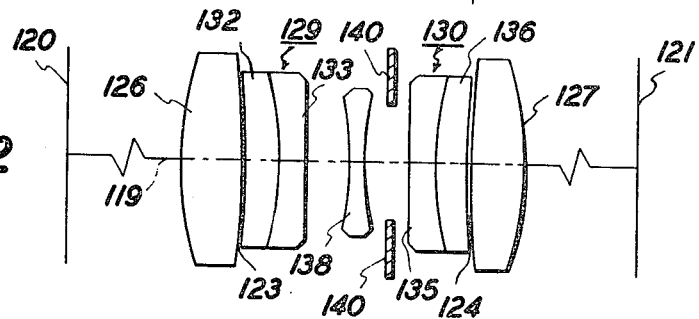
FIG. 2 is a schematic of an embodiment of the present zoom lens system wherein the various lens elements are arranged for 1:1 magnification.
Figure 3:
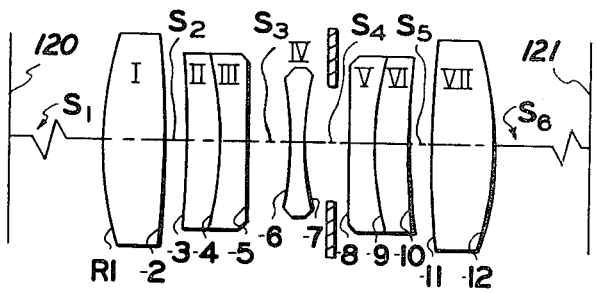
FIG. 3 is a schematic of the zoom lens system of FIG. 2 with the severed lens elements displaced relative to one another to change focal length and with the entire lens system moved closer to the object to maintain the image focused onto the same image plane as in FIG. 2.

FIGS. 2 and 3 illustrate the Heliar zoom lens system with the lens elements positioned in FIG. 3 for some magnification other than the 1X magnification arrangement illustrated in FIG. 2. The Heliar zoom lens system includes; the symmetrical right and left severed elements 126 and 127; the symmetrical right and left doublets 129 and 130, comprised of elements 132, 133, 135 and 136 with elements 132 and 136 mating with the severed elements 126 and 127; the center element 138; and the aperture 140.

Figure 4:
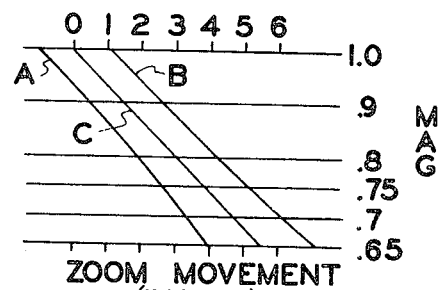
FIG. 4 is a graph of magnification versus displacement with curves A and B depicting the relative axial position and displacement of the severed lens elements of FIG. 2 and curve C depicting the relative axial position and displacement of the center of the lens system of FIG. 2.

The graph of FIG. 4 is helpful in illustrating the displacements of the lens elements resulting in the various magnifications. The vertical axis is calibrated in terms of magnification with, for example, 0.8 representing a magnification of either 1:0.8 (0.8X) or its reciprocal 1:1.25 (1.25X) if the lens group is moved in the same manner in the opposite direction. The horizontal axis is calibrated in inches.

Curve C represents the displacement of the central lens group 129, 130, 138 from its "normal" position when arranged for 1X magnification as in FIG. 2. The direction of the system displacement is toward the image plane 121 for magnifications of less than 1X and toward the object plane 120 for magnifications of less than 1X.

Curves A and B are lines that represent the displacement of the severed elements 126 and 127 and show their position relative to that of their adjacent doublets 129 and 130, represented by curve C. The displacements of elements 126 and 127 are identical but in opposite directions. Curve B is the sum of the lens system displacement, represented by Curve C, plus the displacement of the severed element 127 relative to the system. Similarly, Curve A is the difference between the lens system displacement, represented by Curve C, and the displacement of lens element 126 relative to the system.

The displacements depicted by the curves may be made by hand or by machine and they may occur in sequence or simultaneously. As noted at the outset, the term "zoom lens" is usually applied to systems wherein all the displacements are made simultaneously but is used herein to also include manual sequential displacements. The sequential operation is acceptable for photocopying applications because there is no need to have the image in focus continuously as is the case with photography and television. The rate of movement whether simultaneous or sequential is a matter of preference for a particular application.

A variety of mechanisms for effecting the above described displacements are known to the art and may be used in connection with the present lens systems. This invention is not limited by any such detail of mechanism. A very simple mechanism is one including a carriage supporting all the lens elements and including two pulleys with an endless belt wrapped around them. The severed lens elements 126 and 127 can be displaced in equal and opposite distances by coupling each element to sections of the endless belt on opposite sides of the pulleys.

Figure 5:
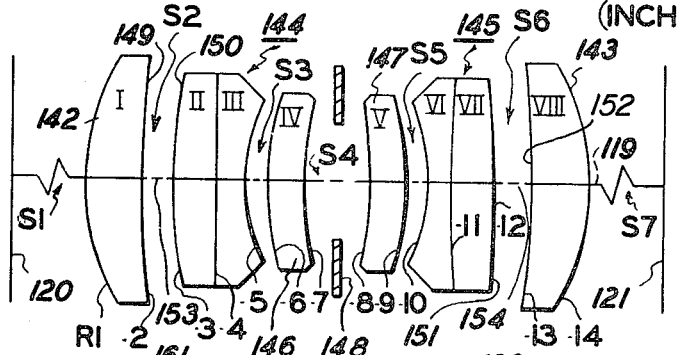
FIG. 5 is a schematic of an embodiment of the present invention wherein a split Dagor lens system is converted to a zoom lens.

FIG. 5 illustrates the application of the present invention to a symmetrical split Dagor lens system. When the severed lens elements 142 and 143 abut the doublets 144 and 145, the combined elements plus the singlets 146 and 147 and aperture 148 comprise a split Dagor lens system. The cirtical curvatures of this embodiment are those of the mating surfaces 149 and 150 and the mating surfaces 151 and 152. Once again, the magnification range is obtained by varying the spacings 153 and 154 between the critical mating surfaces and by moving all the elements relative to the fixed object and image planes 120 and 121. A graph similar to that in FIG. 4 may be prepared for the Dagor zoom lens system. The curves depicting the displacements for the Dagor lens system are empirically determined as are curves A, B and C for the Heliar lens system. The displacements for the severed elements 142 and 143 are equal in distance and opposite in direction. Also, all the displacements are linear but the slopes of the curves for the Dagor system are different from those for the Heliar system. In fact, the slopes of the curves defining the placements are unique for even different systems of similar type, i.e., for two different Heliar or Dagor zoom lens systems.

Figure 6:
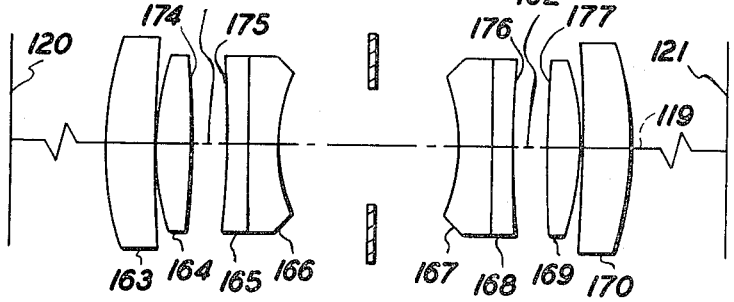
FIG. 6 is a schematic of an embodiment of the present invention wherein a Gauss lens system is converted to a zoom lens.

FIG. 6 illustrates the application of the present invention to a symmetrical Gauss lens system. Here the parent lens elements that are severed are not the outermost elements in the system but those adjacent the outermost elements. A Gauss lens system includes substantially the same elements as the split Dagor but the singlets are placed in close proximity to the outside surfaces of the doublets. Consequently, when the spacings 161 and 162 are reduced to zero, the lens elements 163–170 constitute a Gauss lens system. The critical curvatures for this embodiment are the curves of the mating surfaces 174 and 175 and the mating surfaces 176 and 177. The magnification range is obtained by varying the spacings 161 and 162 and by moving all the lens elements relative to the object and image planes 120 and 121. Here as with the embodiment of FIG. 5, a graph similar to that in FIG. 4 may be prepared for the Gauss zoom lens system. The curves defining the displacements for the severed elements and for the entire system corresponding to curves A, B and C in FIG. 4 are empirically derived. The displacement for the severed elements 164 and 169 are equal in distance but opposite in direction. All the displacements are linear but the slopes of the curves are unique for each Gauss zoom lens system.

In the Gauss zoom lens system the "telescoping" lens elements include the pairs 163–164 and 169–170. In the Heliar and Dagor zoom systems the telescoping elements 126 and 127 (for the Heliar) and 142 and 143 (for the Dagor) are singlets. In each case the severed or telescoping lenses are the outermost elements or pairs in the system. Any of the zoom lens systems described may include other lens elements and the term "outer" is intended to refer only to the Heliar, Dagor, Gauss or other portion of the system that is modified by the critical curvatures and telescoping displacements. One of the parameters affecting the amount of motion of the outer elements is the ratio of the power of outer elements to inner elements.

Referring specifically to the Heliar zoom lens system of FIGS. 2 and 3, the parameters of the lens elements which make up this optical system are listed in the following table in which $N_D$ is the refractive index for the D line of sodium and V is the Abbe number. Radii (R), Thicknesses (T), and Spacings (S) are expressed in inches and a negative sign indicates radii on centers of curvature lying on the object side of their vertices. $S_1$ and $S_6$ indicate spacings between conjugate planes and their next adjacent lenses.

EFL = 13.5"  f/5.6

| LENS | RADIUS(R) | THICKNESS (T) | SPACING (S) | REFRACTIVE INDEX $N_D$ | ABBE NO. V |
|---|---|---|---|---|---|
| | | | $S_1$ (1.0X)=24.640554<br>(.74X)=28.655432<br>(.653X)=30.166556 | | |
| I | $R_1$=5.278418<br>$R_2$=−37.345901 | $t_1$=0.890132 | | 1.62041 | 60.33 |
| | | | $S_2$ (1.0X)=0.010222<br>(0.74X)=0.149659<br>(0.653X)=0.302905 | | |
| II | $R_3$=−37.345901<br>$R_4$=−4.328522 | $t_2$=0.497721 | | 1.62041 | 60.33 |
| III | $R_5$=142.446894 | $t_3$=0.363031 | | 1.52341 | 51.49 |
| | | | $S_3$ = 0.574431 | | |
| IV | $R_6$=−4.888708<br>$R_7$=4.888708 | $t_4$=0.234356 | | 1.52630 | 51.00 |
| | | | $S_4$ = 0.574431 | | |
| V | $R_8$=−142.446894 | $t_5$=0.363031 | | 1.52341 | 51.49 |
| VI | $r_9$=4.328522<br>$R_{10}$=37.345901 | $t_6$=0.497721 | | 1.62041 | 60.33 |
| | | | $S_5$ (1.0X)=0.010222<br>(0.74X)=0.149659<br>(0.653X)=0.302905 | | |
| VII | $R_{11}$=37.345901<br>$R_{12}$=−5.278418 | $t_7$=0.890132 | | 1.62041 | 60.33 |
| | | | $S_6$ (1.0X)=29.364635<br>(0.74X)=25.070867<br>(0.653X)=23.253260 | | |

Referring specifically to the split Dagor zoom lens system of FIG. 5, the parameters of the lens elements which make up this optical system are listed in the following table in which $N_D$ is the refractive index for the D line of sodium and V is the Abbe number. Radii (R), Thickness (T), and Spacings (S) are expressed in inches and a negative sign indicates radii on centers of curvature lying on the object side of their vertices. $S_1$ and $S_7$ indicate spacings between conjugate planes and their next adjacent lenses.

EFL = 13.5"  f/8

| LENS | RADIUS (R) | THICKNESS (T) | SPACING (S) | REFRACTIVE INDEX $N_D$ | ABBE NO. V |
|---|---|---|---|---|---|
|  |  |  | $S_1$ (1.0X)=23.253144<br>(.74X)=27.379144<br>(.653X)=29.085144 |  |  |
| I | $R_1$=3.9656<br>$R_2$=38.9496 | $t_1$=.595 |  | 1.63854 | 55.38 |
|  |  |  | $S_2$ (1.0X)=.164<br>(.74X)=.286<br>(.653X)=.420 |  |  |
| II | $R_3$=27.1967<br>$R_4$=∞ | $t_2$=.662 |  | 1.63854 | 55.38 |
| III |  $R_5$=2.5729 | $t_3$=.375 |  | 1.57309 | 42.58 |
|  |  |  | $S_3$ =.254 |  |  |
| IV | $R_6$=3.8399<br>$R_7$=6.0025 | $t_4$=.710 |  | 1.64328 | 47.85 |
|  |  |  | $S_4$ =.928 |  |  |
| V | $R_8$=−6.4204<br>$R_9$=−3.8325 | $t_5$=.679 |  | 1.64328 | 47.85 |
|  |  |  | $S_5$ =.140 |  |  |
| VI | $R_{10}$=−2.8303<br>$R_{11}$=10.0246 | $t_6$=.693 |  | 1.57309 | 42.58 |
| VII | $R_{12}$=−46.8189 | $t_7$=.533 |  | 1.63854 | 55.34 |
|  |  |  | $S_6$ (1.0X)=.164<br>(.74X)=.286<br>(.653X)=.420 |  |  |
| VIII | $R_{13}$=−39.7973<br>$R_{14}$=−4.0813 | $t_8$=.7 |  | 1.63854 | 55.34 |
|  |  |  | $S_7$ (1.0X)=24.533<br>(.74X)=20.183<br>(.653X)=18.296 |  |  |

All the above parameters are given in exact and absolute values. Practical manufacturing tolerances and glass selection tolerances are permissible and contemplated. Also, all of the radii, thicknesses and spacings can be scaled up or down as a function of the focal length.

What is claimed is:

1. A variofocal lens system including, in optical alignment along an optical axis:
   a central lens,
   a pair of doublets, one on each side of said central lens,
   said doublets including an inner lens element having a first refractive index and a first dispersion and an outer lens element having a second refractive index and a second lower dispersion,
   a pair of movable single lenses, one on the outward side of each of said doublets,
   said movable single lenses being of the same material as the adjacent outward element of said doublets and having an inner radius of curvature substantially identical to the outer radius of curvature of said doublets,
   said movable single lenses being arranged for symmetrical movement along said optical axis relative to their adjacent doublets while the entire system is moved relative to the object to vary the focal length of said lens system.

2. A varifocal lens system as defined in claim 1 in which said central lens is a single biconcave lens and said doublets and said movable single lenses are arranged in symmetry with respect to said central lens.

3. A variofocal lens system including, in optical alignment along an optical axis:
   a pair of doublets each including inner and outer lens elements, said inner lens elements having a first refractive index and a first dispersion and said outer lens elements having a second refractive index and a second lower dispersion,
   a pair of movable single lenses, one on the outward side of each of said doublets, said movable single lenses being of the same material as the adjacent outward element of said doublets and each having an inner radius of curvature substantially identical to the outer radius of curvature of its adjacent doublet,
   said movable single lenses being arranged for symmetrical movement along said optical axis relative to their adjacent doublets while the entire system is moved relative to the object to vary the focal length of said lens system.

4. A variofocal lens system including, in optical alignment along an optical axis:
   a central lens,
   a pair of doublets, one on each side of said central lens,
   said doublets including an inner lens element having a first refractive index and a first dispersion and an outer lens element having a second refractive index and a second lower dispersion,
   a pair of movable single lenses, one on the outward side of each of said doublets,
   said movable single lenses being of the same material as the adjacent outward element of said doublets and having an inner radius of curvature substantially identical to the outer radius of curvature of said doublets,
   said movable single lenses being arranged for movement along said optical axis relative to their adjacent doublets while the entire system is moved relative to the object to vary the focal length of said lens system.

5. A variofocal lens system including, in optical alignment along an optical axis:
   a pair of doublets each including inner and outer lens elements, said inner lens elements having a first refractive index and a first dispersion and said outer lens elements having a second refractive index and a second lower dispersion,
   a pair of movable single lenses, one on the outward side of each of said doublets, said movable single lenses being of the same material as the adjacent outward element of said doublets and each having an inner radius of curvature substantially identical to the outer radius of curvature of its adjacent doublet,
   said movable single lenses being arranged for movement along said optical axis relative to their adjacent doublets while the entire system is moved relative to the object to vary the focal length of said lens system.

* * * * *